Aug. 25, 1925.
W. H. J. STACY
SCREW DOWN STOP VALVE
Filed Dec. 2, 1924
1,551,436
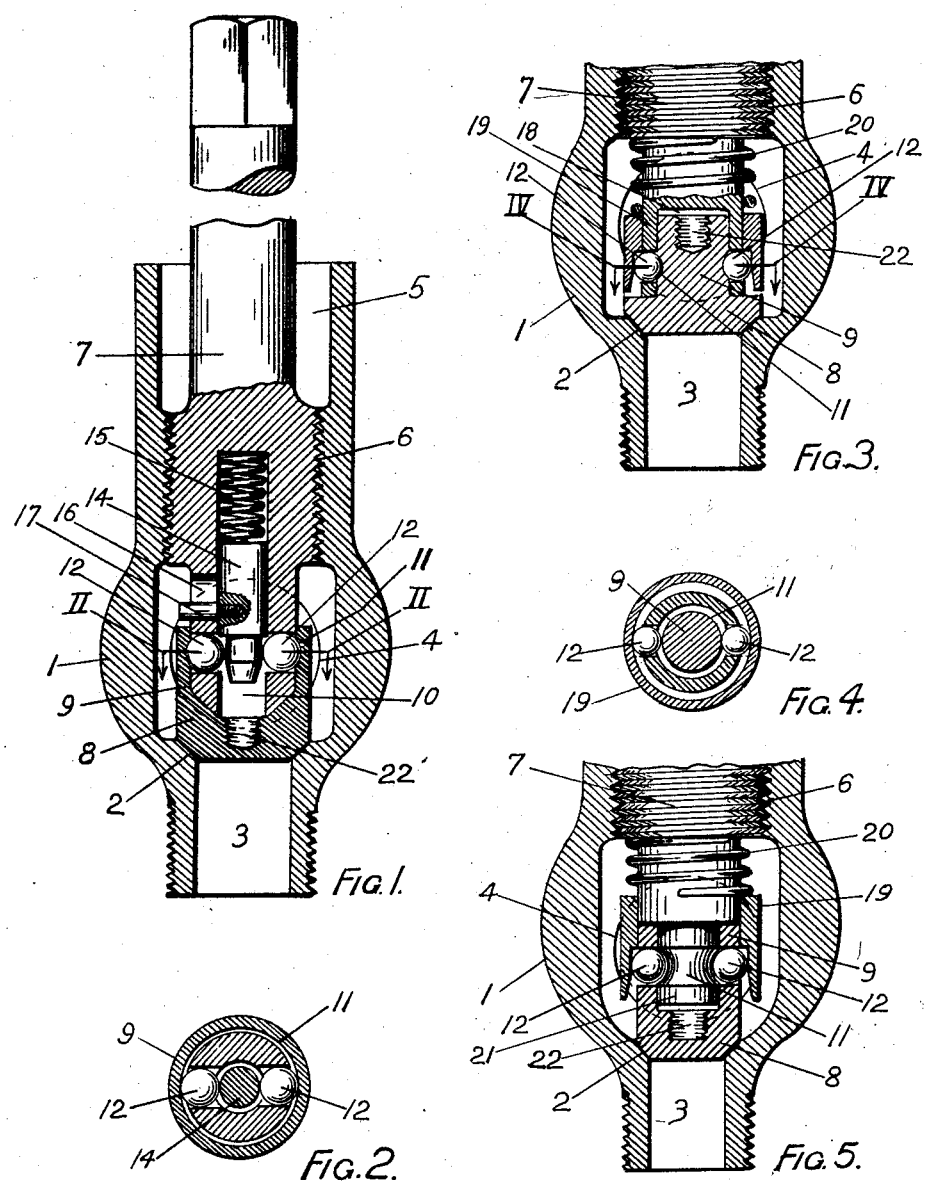

Patented Aug. 25, 1925.

1,551,436

UNITED STATES PATENT OFFICE.

WILLIAM HERBERT JOHN STACY, OF LINDFIELD, NEAR SYDNEY, NEW SOUTH WALES, AUSTRALIA.

SCREW-DOWN STOP VALVE.

Application filed December 2, 1924. Serial No. 753,508.

*To all whom it may concern:*

Be it known that I, WILLIAM HERBERT JOHN STACY, a subject of the King of Great Britain and Ireland, and resident of Limpley Stoke, Northcote Road, Lindfield, near Sydney, in the State of New South Wales, Commonwealth of Australia, have invented certain new and useful Improvements in Screw-Down Stop Valves (for which I have filed applications in Australia, Nos. 17,961 on the 27th May, A. D. 1924, and 18,344 on the 23rd June, A. D. 1924), of which the following is a specification.

This invention relates to stop valves of the type in which the spindle, on the inner end of which is the valve, is screw-threaded and engages a complementary screw thread in the body or in an attachment thereon, so that as the spindle is rotated the valve is moved towards or from its seat to close or open it according to the direction of rotation of the spindle. More particularly the invention relates to valves of this type in which the valve seat is located at the inner end of a long narrow bore, said bore being screw-threaded for part of its length to receive the threaded valve spindle.

In this type of valve the actual valve which bears upon the seat must be attached to the end of the spindle (or is commonly integral therewith) so that it will be positively moved to or from the seat by the inward or outward movement respectively of the spindle as it is rotated. It is however occasionally necessary to regrind the valve and seat by placing between them fine abrading material and rotating one on the other while they are pressed towards each other, but it is obviously impossible to do this while the valve is attached to the spindle as rotation of the latter either forces the valve progressively towards or retracts it from the seat. It is also advisable that the valve shall be attached to the spindle in such manner that the latter may be turned independently of the valve.

The object of this invention is to provide a novel construction of parts and means whereby the valve is detachably secured to the spindle in such manner as to permit either to be rotated independently of the other yet ensuring that the valve shall move inwardly and outwardly (as the case may be) on rotation of the spindle, and to provide a valve which is readily attachable to another implement used in the regrinding operation. A still further object of the invention is to provide a construction whereby the valve is so securely locked to the spindle as to prevent the valve from sticking to its seat, and prevent pressure on the back of the valve from holding the latter to its seat and consequent separation of the valve and spindle when the latter is retracted with the object of opening the valve.

A still further object of the invention is to provide an improved combination tool for use in the regrinding of a valve normally attached to the spindle in the manner aforesaid but detached therefrom for the purpose of being reground.

With these objects the invention consists in a stop-valve including a valve formed with a stem fitting either in or about the inner end of the spindle, one of said elements being formed with an annular groove, and a pair of balls or plungers carried by the other element and moved radially inwardly or outwardly by means of spring pressure (applied directly or indirectly) to engage said groove and thus releasably hold the valve to the spindle, said valve being also formed for attachment to a separate tool used in the regrinding operation.

The invention also consists in means whereby the valve is positively but releasably locked to the spindle, such means comprising a spring pressed slidable element designed to force the balls radially either inwardly or outwardly into engagement with the groove and to maintain such engagement.

The invention further consists in a tubular substitute spindle and valve-holding key for use in the regrinding operation as hereinafter explained.

In the accompanying drawings which depict various embodiments of my invention.

Fig. 1 is a sectional elevation of valve construction according to my invention, and Fig. 2 a sectional plan view on line II II of Fig. 1.

Fig. 3 is a part sectional elevation showing a modification of the construction shown in Fig. 1 and Fig. 4 is a sectional plan on line IV IV of Fig. 3.

Fig. 5 is a part sectional elevation showing a still further modification.

It is not considered necessary to depict a gland-box or any other contrivances or attachments on the valve body as same have no relation to this invention, it being understood that such may be employed if and where required.

In the drawings the same reference numerals indicate corresponding parts in all the figures.

The valve body 1 is formed with a valve seat 2, with inlet and outlet passages 3 and 4 respectively and a long bore 5 which is screw-threaded for part of its length as at 6 to receive the screw-threaded spindle 7 which carries on its inner end the valve 8.

Referring to the construction shown in Figs. 1 and 2; the valve 8 is formed with a hollow stem 9 which neatly fits about the reduced inner end of the spindle 7 which is formed with a bore 10. In the spindle wall about said bore are two radial holes in which are housed balls 12 which engage with an annular groove 11 formed on the valve stem 9. These balls are radially pressed outwardly into engagement with the groove 11, and releasably maintained in that position, by means of a taper-ended plunger 14 slidable in the bore 10 of the spindle and backed by a spring 15. The balls 12 are of such size as to neatly fit between the lower end of plunger 14 (when in operative position as shown) and the wall of the groove 11 on the valve stem, so that the valve is positively locked to the spindle.

Fixed in the plunger 14 and extending laterally through an elongated aperture 16 in the wall of the spindle, is a stud 17. This stud is provided for the purpose of affording convenient means whereby the plunger 14 may be moved against the pressure of the spring 15 to permit the balls 12 to move inwardly and release the valve which may then be drawn off the spindle. This operation is of course performed when the spindle 7 and valve 8 are withdrawn from the body 1.

Referring to Figs. 3 and 4; the valve 8 is formed with a solid stem 9 fitting within a bore 18 in the spindle 7, the groove 11 being formed circumferentially on said stem and the balls 12 housed in holes in the spindle wall about said bore 18. In this construction the locking means comprise a sleeve 19 slidable on the spindle 7 and a backing spring 20, the bore of said sleeve at the end remote from the spring being chamfered to facilitate its riding over the balls 12 to press same inwardly into engagement with the groove 11 on the valve stem.

In the construction shown in Fig. 5, the stem 9 of the valve 8 is hollow as in Fig. 1 and is formed to fit about the reduced end 21 of the spindle 7, the balls 12 being housed in holes in the stem 9 and the complementary locking groove 11 formed on the reduced end 21 of the spindle. Locking means comprising a sleeve 19 and backing spring 20 as before described in reference to the construction shown in Fig. 3, are provided.

In all constructions depicted a threaded hole 22 is formed in the valve or in its stem for the purpose of enabling the valve to be attached to a key or like implement used in the regrinding operation as immediately hereinafter explained.

The spindle 7 with attached valve 8 having been withdrawn from the body 1, the valve is detached from the spindle and is screwed on the threaded end of a key after the latter has been inserted in the bore of a tubular substitute spindle in which it neatly fits so as to be rotatable and axially movable therein. The substitute spindle is formed with a threaded portion corresponding to the thread in the bore 5 of body 1, and with a head formed for engagement by a suitable tool whereby it is screwed in or out of the body. The substitute spindle is then inserted in the body 1, the head determining its position therein and, in conjunction with the threaded portion centering the spindle in the bore 5 of body 1. The regrinding operation is then performed by rotating the key and at the same time pressing it inwardly to cause the valve to bear hard on the seat 2, suitable abrading material being inserted between the valve and seat.

What I claim and desire to secure by Letters Patent is:

1. A stop-valve including in combination a body formed with a valve-seat located between inlet and outlet passages, a spindle screwing into said body, a valve having a stem formed to fit the inner end of the spindle and means for detachably holding said valve stem to the spindle, said means comprising a pair of radially movable balls housed in one of the last mentioned elements and spring pressed into engagement with an annular groove formed on the other element.

2. In a stop valve, in combination, a spindle screwing into the valve body, a detachable valve on the inner end of said spindle, said valve having a stem formed to telescopically fit the inner end of the spindle, and means for releasably locking together said telescopically fitting parts, said means comprising a pair of radially movable balls carried by one of said parts, a locking element slidable axially in relation to the spindle, and a spring pressing said locking element into operative engagement with said balls to radially move same into and maintain them in engagement with an annular groove on the other of said telescopically fitting parts.

Signed at Sydney, New South Wales, this twenty-ninth day of September A. D. 1924.

WILLIAM HERBERT JOHN STACY.